(12) United States Patent
Kono et al.

(10) Patent No.: US 7,184,576 B2
(45) Date of Patent: Feb. 27, 2007

(54) PERSONAL AUTHENTICATION SYSTEM

(75) Inventors: Miyuki Kono, Kokubunji (JP); Masao Kamahori, Musashino (JP); Hitoshi Matsuo, Kokubunji (JP); Hiroshi Masuzawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 663 days.

(21) Appl. No.: 10/372,389

(22) Filed: Feb. 25, 2003

(65) Prior Publication Data

US 2004/0057605 A1    Mar. 25, 2004

(30) Foreign Application Priority Data

Sep. 20, 2002    (JP)    ............... 2002-274281

(51) Int. Cl.
*G06K 9/00*    (2006.01)

(52) U.S. Cl. ............... 382/115; 382/116; 382/117; 340/5.53; 340/5.83

(58) Field of Classification Search ........ 382/115–118; 340/5.53, 5.83; 235/379
See application file for complete search history.

(56) References Cited

U.S. PATENT DOCUMENTS 4,699,149 A * 10/1987 Rice ........................... 600/475

2004/0015450 A1 *   1/2004  Zingher et al. ............... 705/64

FOREIGN PATENT DOCUMENTS

| JP | A-10-79071 | 3/1998 |
|---|---|---|
| JP | A-2000-20794 | 1/2000 |
| JP | A-2002-83298 | 3/2000 |
| JP | A-2000-298756 | 10/2000 |
| JP | A-2001-184507 | * 6/2001 |

* cited by examiner

*Primary Examiner*—Bravesh M. Mehta
*Assistant Examiner*—John Strege
(74) *Attorney, Agent, or Firm*—Antonelli, Terry, Stout and Kraus, LLP.

(57)    ABSTRACT

In a place where the personal authentication is requested, if there occurs an emergency, e.g., an authenticatee is forced to unlock a key under threat against the authenticatee's will, there is provided an urgency report system that has lowered both a danger of an authentication apparatus's false operation and a risk of being detected from those around the authenticatee. In the personal authentication technology based on a finger-vein authentication, the employment of the following methods makes it possible to enter a rescue mode and to issue an urgency report: Actively deforming the finger-vein pattern in captured image, pushing a switch, which becomes a trigger for starting the authentication, longer than a predetermined time, or using a rotational motion of the finger.

8 Claims, 5 Drawing Sheets

FIG. 3
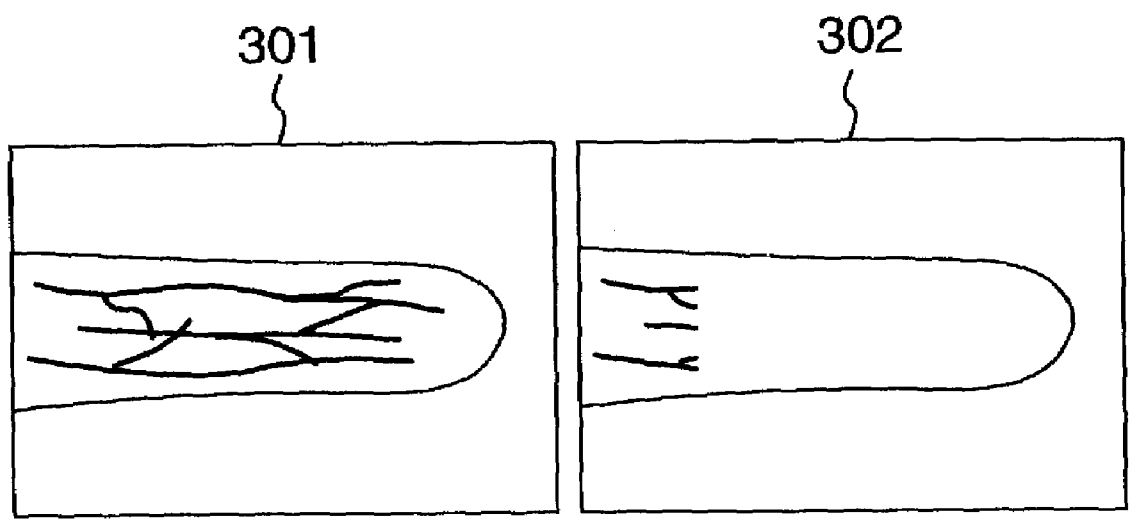
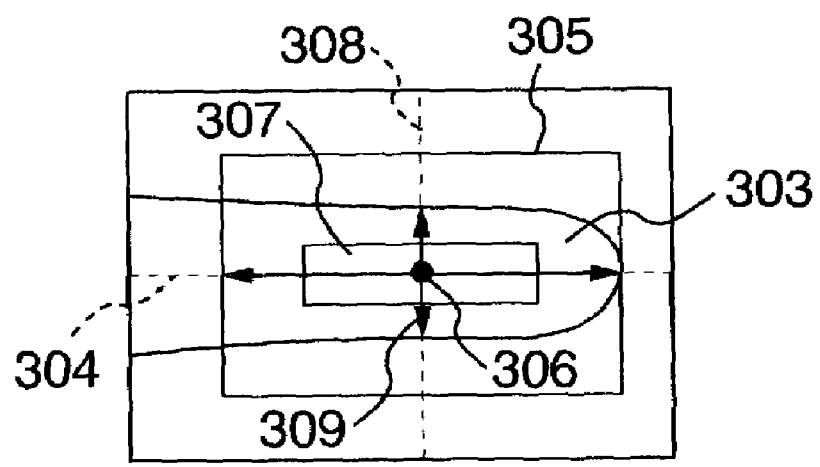

FIG. 6A
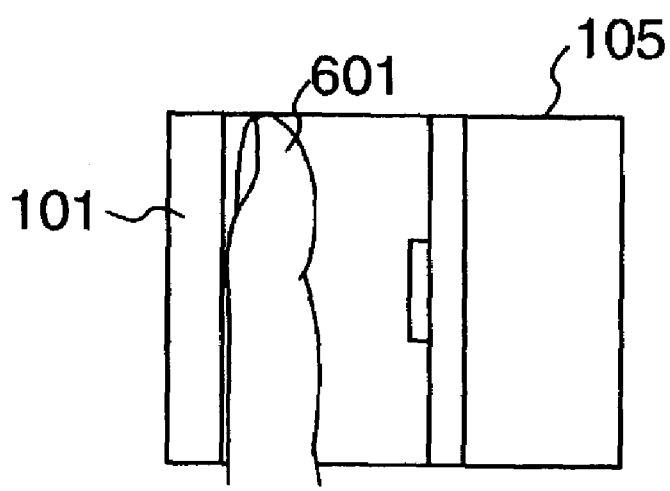
FIG. 6C
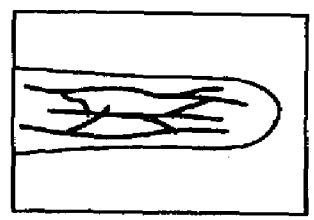
FIG. 6B
FIG. 6D
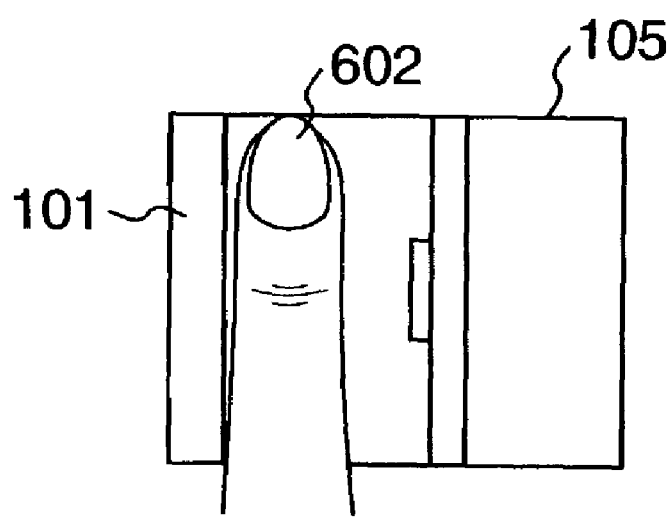
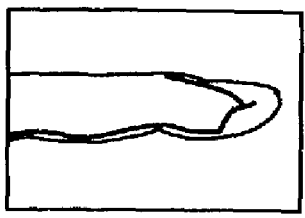

PERSONAL AUTHENTICATION SYSTEM

BACKGROUND OF THE INVENTION

1. Field of the Invention

The present invention relates to a biometrics-based personal authentication technology, individual differences in the finger-vein patterns. In particular, it relates to an entering-room or leaving-room management technology using this personal authentication technology.

2. Description of the Related Art

As one of personal authentication technologies, there exists a method of performing the authentication with the use of a finger-vein pattern image captured using near-infrared light (refer to, e.g., JP-A-2001-184507).

In a place where a comparatively high-level security is requested, such as an entrance or an exit to an under-management area, it is necessary to perform an authentication of confirming the identification of a person to be authenticated. In addition to this, as a countermeasure against an emergency where the authenticatee is being forced to unlock the key under threat against the authenticatee's will, it is also necessary to prepare a method of ensuring the safety of both the authenticatee and the under-management area. As a widely known method, there exists the method of using an emergency button: In a cash automatic-transaction machine, there exist the following methods: A method where, when the user feels the danger of his or her safety or life, the user uses an urgency code so as to make it impossible to withdraw the cash from the machine (refer to, e.g., JP-A-10-79071), or a method where the use of an urgency-report personal identification number allows an urgency report to be issued such that a robber existing near the client does not recognize the issuing of the report (refer to, e.g., JP-A-2000-20794). Also, in a fingerprint authentication scheme or a retina authentication scheme, there exists the following method: A finger or an eye that differs from the ordinary authenticating finger or eye, or a finger or an eye whose direction differs from the ordinary direction is selected as security-interrelated authentication information (refer to, e.g., JP-A-2000-298756).

In the above-described method of using the emergency button, if the threatening criminal exists near the user, the user finds it very difficult to take the action of pushing the button. In the above-described method of using, the finger that differs from the ordinary one for authentication, the user needs to make a motion that differs from ordinary motions, although the user need not take so conspicuous and straight-forward an action as pushing the button. Actually, even a situation can be assumed where the user cannot make even this motion because of fear. Even if the user summons up his or her courage to take the action, the unusual movement is accompanied by a risk of being detected and seen through by the criminal who has kept watching all the actions of the user. This, accordingly, requires the implementation of a method for issuing the urgency report on the emergency to internal and external concerned agencies without being noticed by the criminal. Also, it is requested that a personal authentication apparatus for implementing the above-described authentication and urgency report perform no false operation.

SUMMARY OF THE INVENTION

Of the inventions to be disclosed in the present application, the outline of a representative invention will be explained briefly as follows: There is provided a personal authentication apparatus including a storage unit for recording registered finger-vein patterns, an interface including a light-source and a camera for acquiring finger-vein pattern by transmitted light through a finger, a control unit, and a communications unit connected to an external network. The control unit performs a personal authentication by extracting a finger-vein pattern from an image captured by transmitted light through a finger by the interface, and by making a comparison between the finger-vein pattern and the registered finger-vein patterns. Moreover, the control unit sends out an urgency notice if an area size in which the finger-vein pattern of the image captured by transmitted light through a finger cannot be detected is larger than a predetermined value. Otherwise, there is provided the personal authentication apparatus that sends out the urgency notice if the finger has been placed on the interface for more than a predetermined time.

Other objects, features and advantages of the invention will become apparent from the following description of the embodiments of the invention taken in conjunction with the accompanying drawings.

BRIEF DESCRIPTION OF THE DRAWINGS

FIG. 3 illustrates an ordinary authenticating finger-vein pattern and an emergency finger-vein pattern;

FIGS. 6A–6D are views for explaining a finger-placing-on manner in the no-switch type authentication apparatus.

DESCRIPTION OF THE EMBODIMENTS

Figure 1:
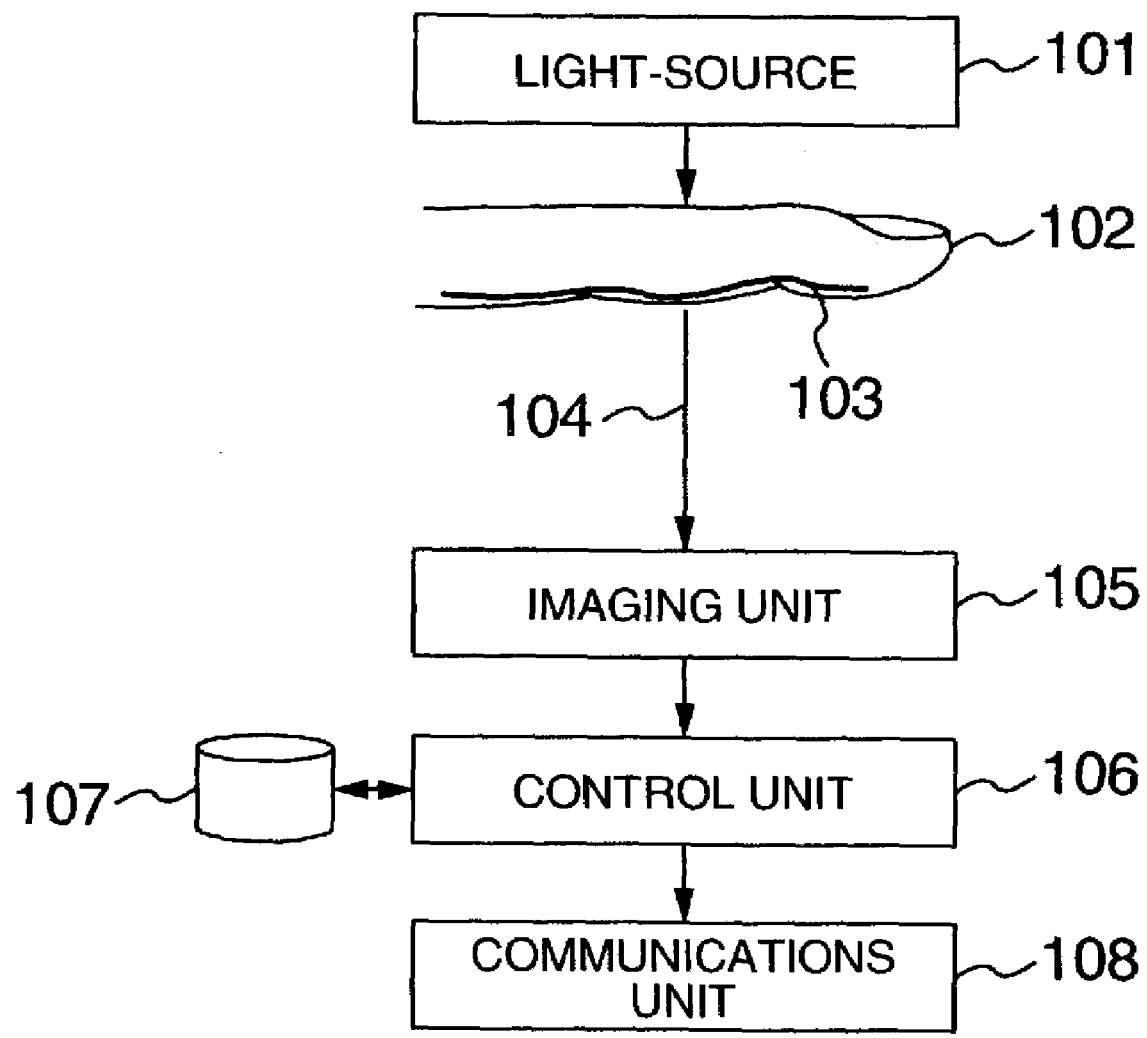
FIG. 1 is a conceptual diagram of a finger-vein authentication system on which a rescue mode is mounted.

Hereinafter, the explanation will be given below concerning the embodiments of the present invention. FIG. 1 is a conceptual diagram of a finger-vein authentication system on which a rescue mode is mounted. Using near-infrared light 103 emitted from a light-source 101 to a finger 102, the image of a finger-vein pattern is photographed using a imaging unit 105 that includes a camera. An ordinary authentication apparatus, using a control unit 106, performs controls over finger-vein patterns registered in a personal information database 107, the calculation of an authentication, the open/close of a door, and the like. In addition to these configuration components, the present invention includes a communications unit 108. If, in the authentication process, the situation has been detected and regarded as an emergency, the present authentication apparatus issues an urgency report as well to internal and external concerned agencies, using the communications unit 108.

In order to detect whether or not an emergency arises, a finger-vein pattern image is used which has been intentionally deformed. Here, the intentionally deformed finger-vein pattern image will be explained below: First, the finger's palm side is pressed against the authentication apparatus, or the finger's joints are bent backward. This condition partially obstructs the bloodstream in the finger-vein, thereby resulting in a state where a part of or almost all of the finger-vein pattern in the captured image has vanished. Here, the finger-vein pattern should be originally detected in the image obtained by transmitting near-infrared light through the finger. The intentionally deformed finger-vein pattern image refers to the finger-vein pattern image where the part of or almost all of the finger-vein pattern has vanished. In the portion pressed against the apparatus, or in the portion between the two joints in the finger bent backward, the bloodstream has been obstructed. This condition makes it impossible to detect near-infrared light absorber (whose typical example is hemoglobin) on the finger's surface portion. Namely, the finger-vein pattern image where the part of or almost all of the finger-vein pattern has vanished is the image where the pixel value of a part of or almost all of the finger in the image is higher than those of the registered images, i.e., the image that looks whitish with the naked eye. If the authentication apparatus detects this image, the apparatus assumes that the emergency has occurred, then issuing the urgency report to the internal and external concerned agencies.

The present method is not accompanied by the motion of changing the ordinary authenticating finger. Accordingly, the present method is difficult to detect and see through. Also, such an extent that the finger touches the authentication apparatus is not strong enough to make the finger-vein pattern vanish on the acquired image. Consequently, the danger of the false operation is extremely low.

Figure 2:
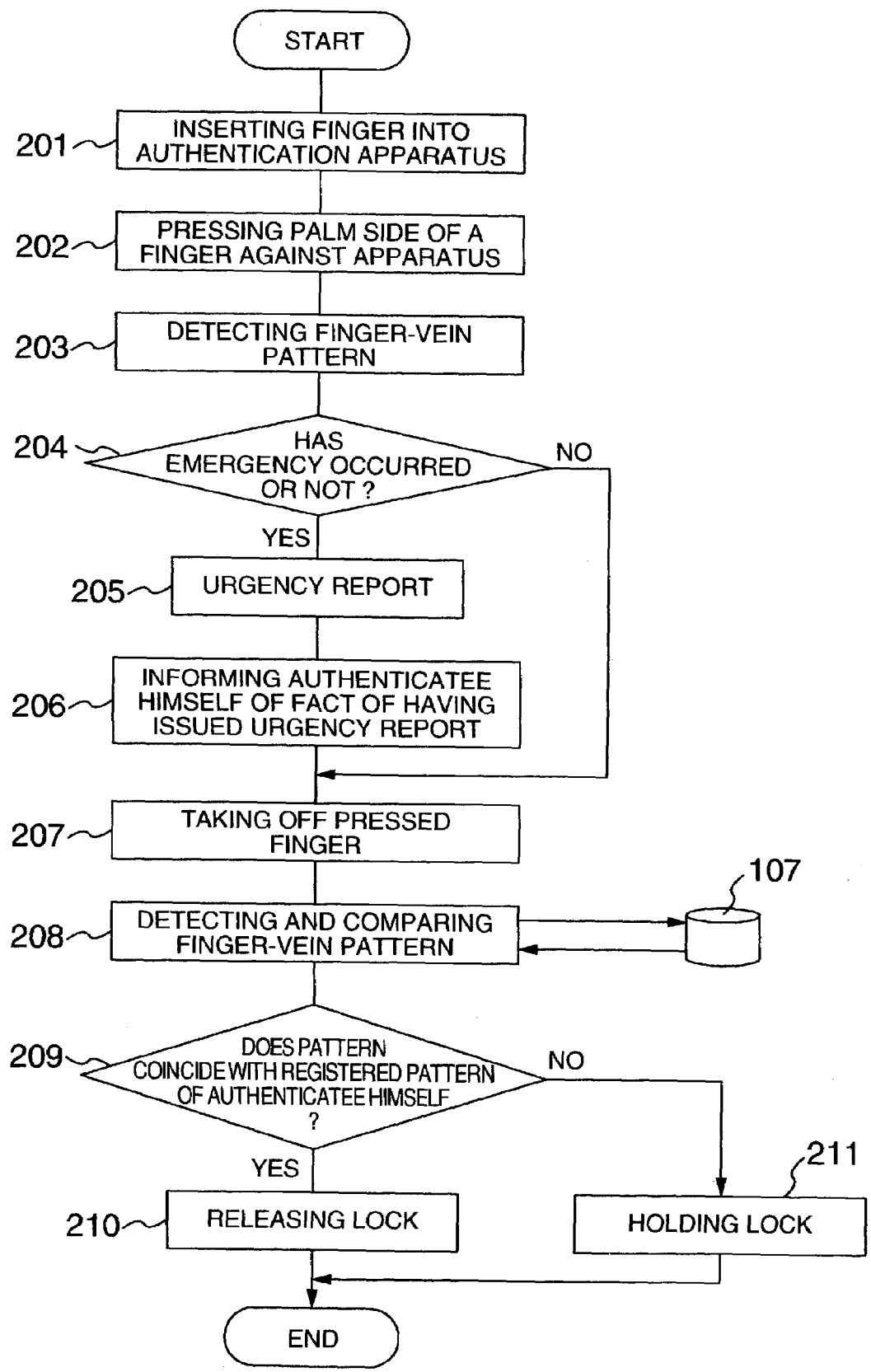
FIG. 2 is a flowchart diagram of the authentication under an emergency.
Figure 4:
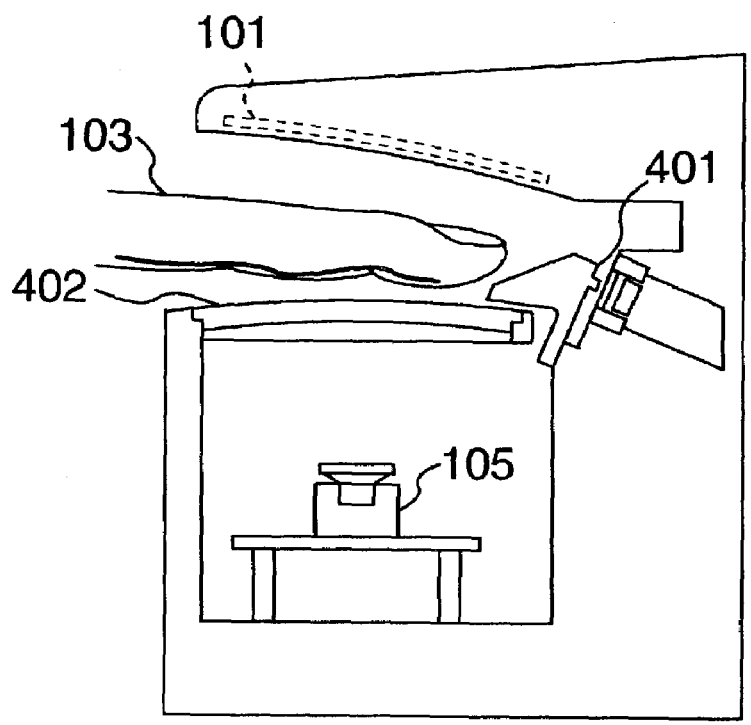
FIG. 4 is a schematic diagram of an interface of a finger-placed-on portion in a switch-attached authentication apparatus.

FIG. 2 illustrates a flowchart diagram of the authentication under an emergency. FIG. 3 illustrates an ordinary authenticating finger-vein pattern 301 and an emergency finger-vein pattern 302. Here, the emergency finger-vein pattern refers to the above-described intentionally deformed finger-vein pattern image. FIG. 4 illustrates a schematic diagram of an interface of a finger-placed-on portion in a switch-attached authentication apparatus. In FIG. 4, the electrical wiring concerned is omitted.

In FIG. 2, at first, the finger is inserted into the finger-vein authentication apparatus (step 201). Next, palm side of the finger is pressed against the authentication apparatus (step 202), thereby deforming the finger-vein pattern image just like the emergency finger-vein pattern 302 illustrated in FIG. 3. If the authentication apparatus is a switch-attached authentication apparatus illustrated in FIG. 4, acquiring the image (e.g., 30 frames/second) is started when the switch is pushed, and the operation of an authenticating program is started accordingly. Namely, a switching push button 401 is pushed, and at the same time, the palm side of the finger is pressed against a panel portion 402 of the apparatus. Instead of pressing the palm side of the finger against the apparatus, the finger is bent backward. This also allows the finger-vein pattern to vanish from on the finger-vein pattern image, thereby making it possible to obtain basically the same effect. Next, the imaging unit 105, whose typical example is a CCD camera, photographs the finger-vein pattern. Moreover, the control unit 106 performs the detection (step 203) of the finger-vein pattern, then making a judgement (step 204) on whether or not an emergency has occurred. This judgement is made as follows: Detecting whether or not the area of the portion where the finger-vein pattern has vanished, which has been illustrated in 302 in FIG. 3, exceeds a predetermined area, otherwise, making a judgement on whether or not the finger-vein pattern coincides with the corresponding emergency pattern registered in advance.

In the image acquired by the imaging unit 105, using a method described in JP-A-2002-83298, the identification of the finger's central line 304 and the cut-out of an authenticating finger image are performed based on the finger's profile 303. Next, in a predetermined area 307 in proximity to the center 306 of the cut-out finger image 305, it is judged whether or not the finger-vein pattern can be detected. This range is defined as a range of, e.g., the following rectangle: A rectangle whose center is common to that of the cut-out finger image, whose length in the finger's long-axis direction is equal to ½nd of the length of the cut-out finger image in that direction, and whose length in the finger's short-axis direction is equal to ⅓ the inter-profile distance 309 on the straight line 308 that passes through the center 306 and that is perpendicular to the central line 304. This range is the portion where, although the pattern is detected at the time of the ordinary authentication, the pattern vanishes earlier than the one near finger edge when the finger is pressed against the authenticating window-panel portion 402.

Hereinafter, the explanation will be given below concerning the emergency-occurrence judging method by selecting, as an example, a case where a ternary image is used as the authenticating image. The ternary image has three different pixel values and each value indicates: 1. there exists a finger-vein pattern, 2. it is uncertain whether or not there exists a finger-vein pattern; and 3. no finger-vein pattern exists. If any one of the pixel values in the existence judging area 307 of the finger-vein pattern has none of a value that indicates the existence of the above-described 1 finger-vein, the authentication apparatus judges that the finger-vein pattern has vanished within this area, thereby assuming that an emergency has occurred. In this case, the apparatus, using the communications unit 108 in FIG. 1, issues an urgency report to in-advance registered urgency-report destinations such as a security guard or a police. In addition, the apparatus informs the authenticatee of the fact that the apparatus has issued the urgency report (step 206). This is performed using a method that no one except the authenticatee himself or herself can recognize, e.g., a vibration of the switch 401 set up at the portion that the fingertip touches. The moment the authenticatee takes the finger that has touched the portion off the apparatus, the control unit 106 performs the detection of the finger-vein pattern and the comparison of the finger-vein pattern with registered information in the database 107. The registered information refers to image data whose typical example is the ternary image after extracting or emphasis-processing the finger-vein pattern, or data resulting from encrypting this image data for the security upgrading. As a result of the comparison, if the identification of the authenticatee himself or herself has been confirmed, the lock is released (step 210). Meanwhile, if the identification has been not confirmed, the lock is not released (step 211). At this time, the time needed for the series of flows in the flowchart is equal to about several seconds.

Moreover, the authentication starting button 401 set up in the authentication apparatus is pushed longer than ordinarily, which also allows the authentication apparatus to have basically the same function. In this case, the apparatus measures a time during which the switch has been pushed. Then, if this time is longer than a predetermined one, the apparatus judges that the emergency has occurred, then issuing the urgency report to the concerned agencies. In this scheme, by setting up the threshold value of the above-described time to be a little bit longer time, e.g., about 2 seconds, it becomes possible to run the rescue mode without fail.

Figure 5:
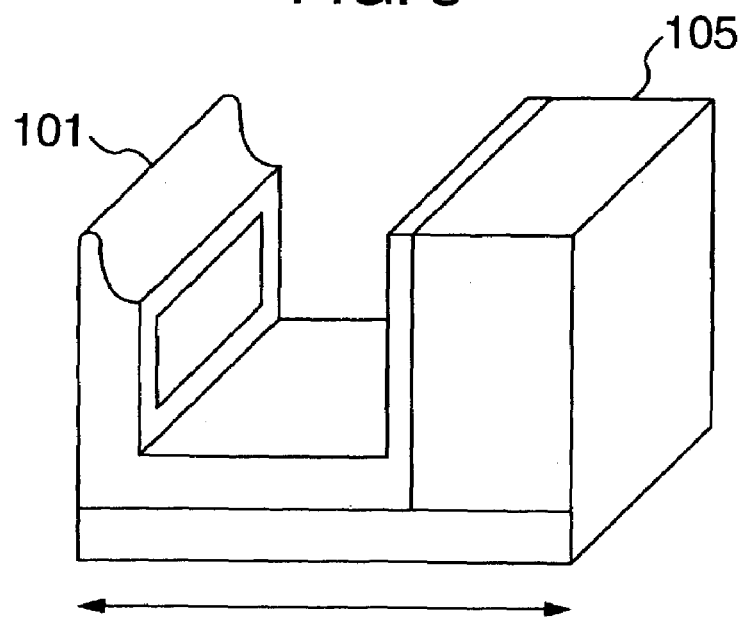
FIG. 5 is a schematic diagram for illustrating the structure of a no-switch type authentication apparatus.

Next, the explanation will be given below concerning a rescue-mode start-up example in the case where the authentication apparatus is of a no-switch type as illustrated in FIG. 5. In FIG. 5, the electrical wiring concerned is also omitted. The present authentication apparatus includes a light-source 101 and a imaging unit 105. A light-source light-quantity control circuit or the like is integrated into the bottom portion of the apparatus. Also, the backboard of the light-source portion is of a structure having a height of such an extent that prevents stray light from entering the imaging unit 105, i.e., a camera. FIG. 6A illustrates the position relationship between the finger and the apparatus when this apparatus is used. FIG. 6A is a drawing where the apparatus is seen from above. The back portion of the finger is placed on the light-source side in a manner where the back portion lightly touches the light-source side. As a result, the apparatus detects that the fingertip portion has been placed in a predetermined area of the image, thereby starting the photographing and the authentication of the finger-vein pattern. At this time, a finger-placing-on manner for ordinarily performing the authentication is indicated by 601. In order to enter the rescue mode, however, the following steps are required: At first, the finger is inserted into the apparatus in a finger-placing-on manner indicated by 602 in FIG. 6. FIG. 6C and FIG. 6D illustrate examples of the finger-vein pattern images photographed in the respective finger-placing-on manners. Rotating the finger's direction in 602 by 90 degrees results in the finger's direction in 601. When the apparatus recognizes the image in FIG. 6D, the apparatus start preparing to enter a rescue mode. Moreover, when the finger's direction is changed and the authentication of the authenticatee himself or herself is performed in the image in FIG. 6C, the apparatus releases the lock, and at the same time starts up the rescue mode, then issuing the urgency report. Here, both of the finger-vein pattern images in FIGS. 6C and 6D are registered beforehand.

As having been described so far, the explanation has been given concerning the respective rescue modes in the cases where the two different apparatus configurations are used. In either of the two cases, if the amount of registered data is of at the most several tens of people, it is possible to make the comparison with all the registered data and to perform the above-described series of processings. In the case of the no-switch type apparatus, if the amount of registered data is of an order of 100 people, the ID numbers added are co-used in order to shorten the processing time. In this case, by key-inputting an ID number, the comparison with the image acquired by the authentication apparatus is performed using only the two pieces of images, i.e., the ordinary authenticating image and the rescue-mode image of the corresponding person.

Furthermore, if the release of a rescue mode should become necessary, e.g., a case where a rescue mode has been started up by mistake, there is used a different inputting unit such as a numeric keypad attached to the authentication apparatus. The release of the rescue mode is performed by inputting, from the numeric keypad, a number set up in advance for the release, or by pushing an allocated key (e.g. clear button).

In a place where the personal authentication using a finger-vein is performed, when an authenticatee is being forced to unlock a key under threat against the authenticatee's will, the present invention makes it possible to enter the rescue mode by using the methods that have lowered both the risk of being detected and seen through and the danger of an apparatus's false operation. Also, in the rescue mode, the apparatus of the present invention issues the urgency report to the concerned agencies such as a security guard or a police, thereby making it possible to prevent, down to the smallest possible degree, damages that will spread over the authenticatee, the restricted area, and the restricted data.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A personal authentication apparatus, comprising:
   a storage for storing registered finger-vein patterns,
   an interface including a light-source and a camera for imaging transmitted light through a finger,
   a control unit, and
   communications unit connected to an external network, wherein said control unit performs a personal authentication by extracting a finger-vein pattern from an image captured by said interface, and by making a comparison between said finger-vein pattern and said registered finger-vein patterns,
   said control unit sending out an emergency notice via said communications unit based on detection of an insufficient area of the finger-vein pattern.

2. The personal authentication apparatus as claimed in claim 1, wherein said control unit judges whether or not said area is larger than said predetermined value by making a comparison between said insufficient area of the finger-vein pattern and a for-urgency registered pattern stored in said storage.

3. The personal authentication apparatus as claimed in claim 1, wherein, said control unit judges whether or not said insufficient area of the finger-vein pattern cannot be detected is larger than said predetermined size of area, by detecting an edge of said finger from the image captured by said interface and extracting a predetermined region based on said edge.

4. A personal authentication apparatus, comprising:
   a storage for storing registered finger-vein patterns,
   an interface including a light-source and a camera for imaging by transmitted light through a finger,
   a control unit, and
   communications unit connected to an external network for communicating, wherein said control unit performs a personal authentication by extracting a finger-vein pattern from an image captured by said interface and by making a comparison between said finger-vein pattern and said registered finger-vein patterns,
   said control unit sending out an emergency notice via said communications unit if said finger has been placed on said interface for more than a predetermined time.

5. The personal authentication apparatus as claimed in claim 1, wherein said control unit informs a user that said control unit has performed said emergency notice.

6. The personal authentication apparatus as claimed in claim 5, wherein, by causing said interface to vibrate, said control unit informs said user that said control unit has performed said emergency notice.

7. The personal authentication apparatus as claimed in claim 1, further comprising inputting unit, and
   wherein, if, after sending out said emergency notice and via said inputting unit, said control unit receives an instruction that said emergency notice should be released, said control unit sends out a notice for releasing said emergency notice via said communications unit.

8. A security system connected to a management center, said security system comprising:
   an authentication apparatus having a storage for storing registered finger-vein patterns, an interface including a light-source and a camera for imaging by transmitted light through a finger and a control unit, and an imaging apparatus for imaging a person who places a finger on said interface, wherein said authentication apparatus performs a personal authentication by extracting a finger-vein pattern from an image captured by said interface placed on said interface, and by making a comparison between said finger-vein pattern and said registered finger-vein patterns read out from said storage apparatus, and, if the area size of said finger-vein pattern of said captured image is smaller than a predetermined area, said authentication apparatus sends out an emergency notice to said management center and, using said imaging apparatus, starts said imaging of said person, and sends out said acquired image so that said acquired image will be displayed on displaying unit of said management center.

* * * * *